April 17, 1928.
J. C. MECKLENBURG
1,666,393
CULTIVATOR SHOVEL
Original Filed Oct. 20, 1923
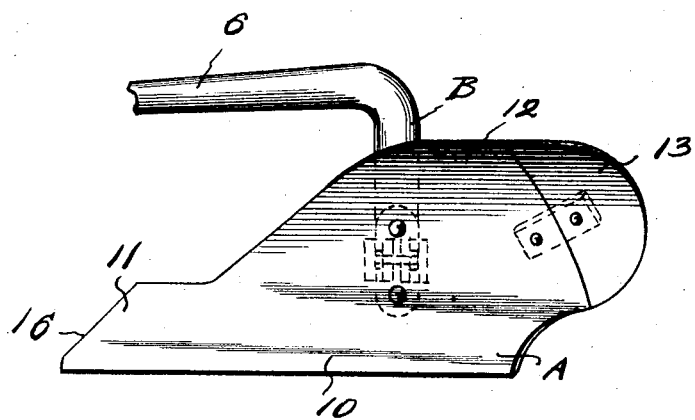
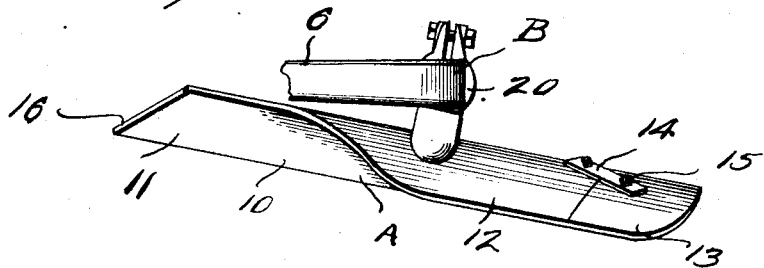
Inventor
JOHN C. MECKLENBURG
Witness
By Richard B. Owen,
Attorney Patented Apr. 17, 1928.

1,666,393

UNITED STATES PATENT OFFICE.

JOHN C. MECKLENBURG, OF HANCOCK, MINNESOTA.

CULTIVATOR SHOVEL.

Original application filed October 20, 1923, Serial No. 669,833. Divided and this application filed December 19, 1924. Serial No. 756,966.

This invention appertains to cultivators and is a division of my prior application entitled "Cultivator shovel" filed October 20, 1923, Serial No. 669,833.

The primary object of the present invention is to provide a novel shovel for corn cultivators which is so constructed as to effectively cut weeds, bushes and the like and thus effectively destroy the same and which will also effectively work a relatively large area of ground during the cutting process.

Another prime object of the invention is the provision of an extension for the mold board of a cultivator shovel, so that the shovel can be effectively used on small growing corn as well as on relatively large growing corn.

A still further object of the invention is to provide an improved cultivator shovel of the above character, which will be durable and efficient in use, one that will be simple and easy to manufacture and one which can be placed upon the market and incorporated with an ordinary corn cultivator at a minimum cost.

With these and other objects in view, the invention consists in the novel construction, arrangement and formation of parts, as will be hereinafter more specifically described, claimed, and illustrated in the accompanying drawings, in which drawings, Figure 1 is a side elevation of one of the improved shovels showing the same attached to a cultivator foot, Figure 2 is a top plan view of the improved shovel showing the same attached to a cultivator.

Referring to the drawings in detail, wherein similar reference characters designate corresponding parts throughout the several views the letter A generally indicates the improved cultivator shovel and B a cultivator foot or standard. The cultivator foot or standard B is of the ordinary construction and is connected at its forward end to the beam 6, as clearly shown in Figures 1 and 2 of the drawing.

While in the drawings I have only illustrated one shovel A, it is to be understood that a plurality of shovels are used on the cultivator, preferably three on one side and three on the other side, the shovels being left and right handed respectively.

The improved shovel A comprises a body portion 10 having the weed cutting nose 11 formed on the forward end thereof and the outwardly and laterally curved mold board 12 on its rear upper end. The body portion 10, the cutting nose 11, and the mold board 12 are preferably formed integral and the shovel can be formed from sheet metal as clearly shown in the drawings.

An independent extension 13 is provided for the mold board 12, when the shovel A is being used for cultivating corn, which has grown to a relatively high height and this extension 13 forms a continuation of the mold board 12. The extension 13 is of course removed when cultivating small corn plants and is detachably connected to the mold board 12 by means of a strap 14. Bolts 15 extend through the strap and the extension 13 and the mold board 12 respectively as clearly shown in Figure 2 of the drawing.

It is to be noted that the cutting nose 11 is provided with a front leading inclined cutting edge 16 and that the body 10 and the nose 11 are arranged at an incline to the vertical, as can be readily seen by referring to the drawing.

The improved shovel A can be connected to the foot B in any desired way preferably by a novel clamp 20, which forms the subject matter of the parent application.

In use of the improved shovel, the same is disposed at an angle to the beam 6 and the nose 11 will effectively sever and uproot weeds, bushes and the like, while the mold board 12 and extension 13 will turn over the earth and thus effectively cultivate the same.

Changes as to details may be made without departing from the spirit or the scope of this invention, but:—

What I claim as new is:—

A cultivator shovel constructed from a single blank of sheet metal including a body portion, a weed cutting nose formed on the body portion and extending an appreciable distance forwardly thereof, a downwardly inclined cutting edge on said nose, the body portion and nose being disposed at an angle to the vertical and to the longitudinal axis of the cultivator beam, and an outwardly and rearwardly curved mold board carried by the upper edge of the body, the rear edge of the body portion being curved upwardly and rearwardly to merge with the downwardly and forwardly curves of the rear edge of the mold board.

In testimony whereof I affix my signature.

JOHN C. MECKLENBURG.